(12) United States Patent
Tanemura et al.

(10) Patent No.: US 7,938,994 B2
(45) Date of Patent: May 10, 2011

(54) METHOD OF CONTROLLING AN INJECTION MOLDING MACHINE

(75) Inventors: Daiki Tanemura, Nagano-ken (JP); Kenichi Shimizu, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 135 days.

(21) Appl. No.: 11/516,635

(22) Filed: Sep. 7, 2006

(65) Prior Publication Data

US 2007/0052137 A1 Mar. 8, 2007

(30) Foreign Application Priority Data

Sep. 8, 2005 (JP) ................................ 2005-260217

(51) Int. Cl.
*B29C 45/82* (2006.01)

(52) U.S. Cl. ...................... 264/40.1; 264/40.3; 264/40.4; 264/40.5; 264/328.1; 264/667; 425/150; 425/587; 425/590; 425/591; 425/451.2; 60/428; 60/486; 92/86.5; 92/142

(58) Field of Classification Search .................. 264/40.1, 264/40.3, 40.4, 40.5, 328.1, 328.11, 328.12, 264/328.13, 664, 667; 425/589, 591, 150, 425/590, 451.2, 587; 60/428, 486; 92/86.5, 92/142

See application file for complete search history.

(56) References Cited

U.S. PATENT DOCUMENTS

| | | | | |
|---|---|---|---|---|
| 3,941,534 A | * | 3/1976 | Hunkar | 425/145 |
| 5,203,747 A | * | 4/1993 | Warren | 475/72 |
| 5,248,248 A | * | 9/1993 | Adly | 425/145 |
| 6,240,758 B1 | * | 6/2001 | Nagakura | 72/20.1 |
| 6,748,739 B1 | * | 6/2004 | Hirano et al. | 60/431 |
| 6,805,827 B2 | * | 10/2004 | Kami et al. | 264/328.1 |
| 2002/0102324 A1 | * | 8/2002 | Groleau | 425/567 |
| 2003/0003178 A1 | * | 1/2003 | Kami et al. | 425/150 |
| 2003/0042640 A1 | * | 3/2003 | Kubota | 264/40.1 |

FOREIGN PATENT DOCUMENTS

| | | | |
|---|---|---|---|
| EP | 0163884 | * | 12/1985 |
| EP | 1287968 | * | 3/2003 |
| JP | 63-53302 | * | 3/1988 |
| JP | 11-34135 A | | 2/1999 |

* cited by examiner

*Primary Examiner* — Joseph S Del Sole
*Assistant Examiner* — Seyed Masoud Malekzadeh
(74) *Attorney, Agent, or Firm* — Birch, Stewart, Kolasch & Birch, LLP

(57) ABSTRACT

In a method of controlling an injection molding machine M which controls specified operational processes in a molding cycle by variably controlling the rotation speed of a driving motor 3 in a hydraulic pump 2 and driving a specified hydraulic actuators 4*a*, 4*b*, . . . , in lowering the pressure Pd of the operational process to a specified pressure Pn, the pressure Pd is forcibly lowered by controlling the driving motor 3 in reverse rotation.

6 Claims, 5 Drawing Sheets

Fig. 5

| OPERATIONAL PROCESS | OPERATION NAME | UNLOAD COMMAND |
|---|---|---|
| MEASUREMENT PROCESS | INJECTION PRESSURE RELEASE | PRESENT |
| | PRE-MEASUREMENT DECOMPRESSION | |
| | MEASUREMENT START TIMING ADJUSTMENT | PRESENT |
| | MEASUREMENT AT SPEED 1 | |
| | MEASUREMENT AT SPEED 2 | |
| | MEASUREMENT AT SPEED 3 | |
| | MEASUREMENT STOP TIMING ADJUSTMENT | PRESENT |
| | DECOMPRESSION START TIMING ADJUSTMENT | PRESENT |
| | DECOMPRESSION | |
| INJECTION PROCESS (SPEED RANGE) | INJECTION START TIMING ADJUSTMENT | PRESENT |
| | INJECTION SWITCHING VALVE ON | PRESENT |
| | INJECTION AT SPEED 1 | |
| | INJECTION AT SPEED 2 | |
| | INJECTION AT SPEED 3 | |
| | INJECTION AT SPEED 4 | |
| | INJECTION AT SPEED 5 | |
| | INJECTION AT SPEED 6 | |
| (PRESSURE HOLDING RANGE) | PRESSURE HOLDING AT PRESSURE 1 | |
| | PRESSURE HOLDING AT PRESSURE 2 | |
| | PRESSURE HOLDING AT PRESSURE 3 | |

METHOD OF CONTROLLING AN INJECTION MOLDING MACHINE

BACKGROUND OF THE INVENTION

1. Field of the Invention

This invention relates to a method of controlling an injection molding machine which controls specified operational processes by variably controlling the rotation speed of a driving motor of a hydraulic pump.

2. Description of the Relevant Art

In general, in a hydraulic injection molding machine, a specified hydraulic actuator is driven by a hydraulic driving unit equipped with a hydraulic pump, based on which operational processes are controlled such as a measurement process and an injection process in a molding cycle. Also, when the operational processes are switched, depressurization is performed on the hydraulic actuator so that the switching is performed smoothly and quickly without the behavior of the previous operational process (residual pressure) affecting the next operational process.

Conventionally, known as a method of depressurizing a hydraulic actuator is a method of depressurizing an injection driving device in an injection molding machine disclosed in Japanese Patent Publication No. 1999(11)-34135. This depressurization method is characterized by the fact that, in an injection driving device wherein a flow control valve and a cartridge valve whose the opening/closing of which is controlled by a pilot valve are installed in a pressure pipeline connecting a hydraulic pump to the injection-side oil chamber of an injection cylinder, and a proportional pressure control valve is selectively connected by a switching valve to a relief valve installed in a branch pipeline between the hydraulic pump and the flow control valve and to a back-pressure valve installed in a branch pipeline between the cartridge valve and the injection-side oil chamber to control the operation pressures of the relief valve and the back-pressure valve, the operation pressure of the back-pressure valve is lowered by the proportional pressure control valve after completing the injection operation of the injection cylinder to depressurize the operation oil in the injection-side oil chamber of the injection cylinder.

However, the depressurization method (control method) of an injection driving device in the conventional injection molding machine has had the following problems.

First, even if the residual pressure of the injection-side oil chamber of the injection cylinder could be made zero, it is possible that the residual pressure of the whole circuit from the back-pressure valve to the hydraulic pump cannot be made zero (unload pressure). Therefore, switching from the injection process using the injection cylinder to the measurement process using a measuring motor (an oil motor) for example, the residual pressure of the hydraulic pump side affects the measurement process, which prevents smooth switching by inducing a shock pressure when switching the operations, also preventing an accurate and stable measurement process.

Second, the operational pressure of the back-pressure valve is lowered by the proportional pressure control valve. Because it is a depressurization method relying on the natural decrease of pressure, the time until the desired pressure is achieved becomes long due to the fluidity and the operation oil and the flow path resistance of the circuit, and the demand of switching the operational processes quickly cannot be sufficiently met.

SUMMARY OF THE INVENTION

The objective of this invention is to provide a method of controlling an injection molding machine which can avoid inconveniences such as the occurrence of shock pressure when switching operations, enable smooth switching, and realize highly precise and stable operation control.

Also, another objective of this invention is to provide a method of controlling an injection molding machine which can switch operations quickly by lowering the pressure quickly to a specified target pressure even if there is fluidity of the operating oil or flow path resistance of the circuit.

In order to achieve this objective, the method of controlling the injection molding machine of this invention is characterized by the fact that, in a control method for controlling specified operational processes in a molding cycle by variably controlling the rotation speed of a driving motor in a hydraulic pump and by driving a specified hydraulic actuator, when each pressure on the operational processes are lowered to a specified pressure, the pressure is forcibly lowered by reverse-rotating the driving motor.

BRIEF DESCRIPTION OF THE DRAWING

FIG. 5: A list showing the concrete operation names and the presence/absence of the unload command performed in the measurement process and the injection process which are a part of operational processes in the molding cycle of the same injection molding machine.

DETAILED DESCRIPTION OF THE PREFERRED EMBODIMENT

Next, a preferred embodiment of this invention is introduced and explained in detail based on the drawings. Note that the attached drawings do not specify this invention but serve for facilitating the understanding of this invention. Also, detailed explanations are omitted for commonly-known parts to avoid ambiguity.

Figure 2:
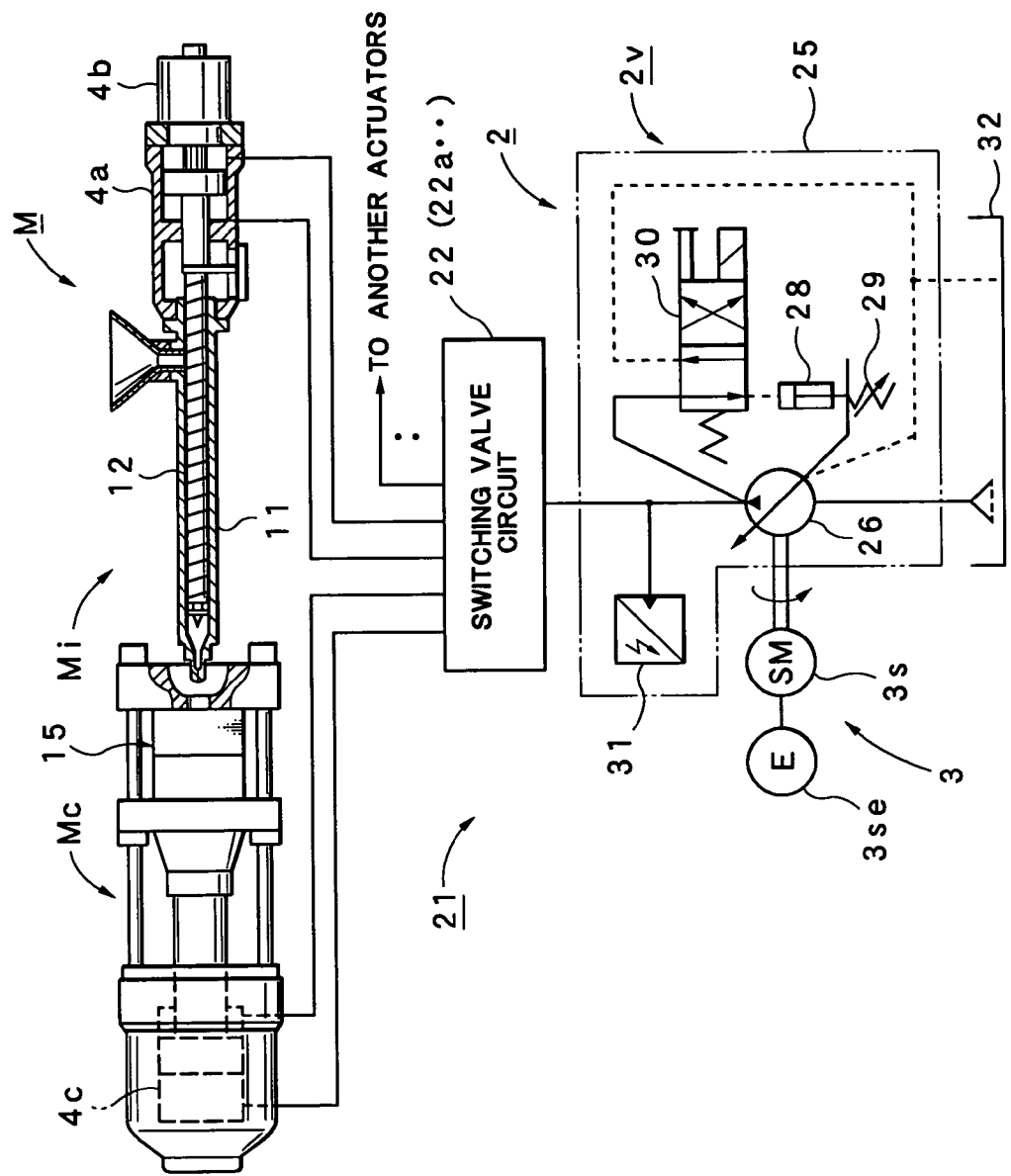
FIG. 2: A construction diagram including a hydraulic driving unit of the injection molding machine used in the same control method.
Figure 3:
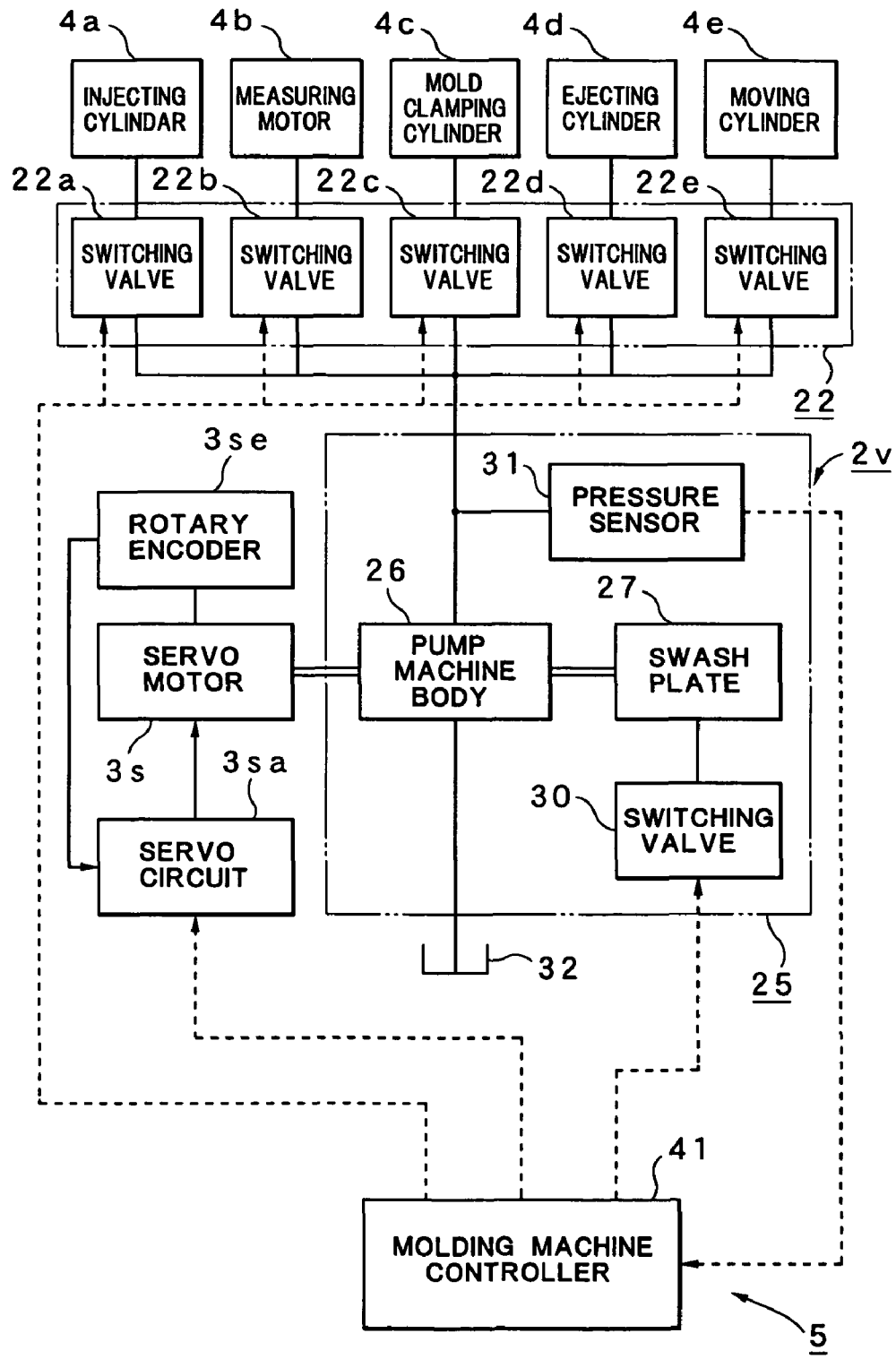
FIG. 3: A block circuit diagram of the hydraulic driving unit in the same injection molding machine.

First, the construction of an injection molding machine M is used in this embodiment with reference to FIG. 2 and FIG. 3.

In FIG. 2, indicated as M is the injection molding machine equipped with an injector Mi and a clamp. The injection molding machine M is equipped with an injection cylinder 4a which drives a screw 12 built in a heating tube 11 in the injector Mi and a measuring motor (oil motor) 4b which rotates the screw 12 as a hydraulic actuator (4a . . . ), and is equipped with a mold clamping cylinder 4c which opens/closes and clamps a metal mold 15 in the clamp (Mc) and an ejection cylinder 4d (FIG. 3) which ejects a molded product in the metal mold 15. Also, it is equipped with an injector moving cylinder 4e (FIG. 3) which performs nozzle touch or its release to the metal mold 15 by driving the injector Mi.

On the other hand, indicated as 21 is a hydraulic driving unit equipped with a variable discharge hydraulic pump 2v (a hydraulic pump 2) which becomes a hydraulic driving source and a switching valve circuit 22. The variable discharge hydraulic pump 2v is equipped with a pump unit 25 and a servomotor 3s (driving motor 3) which drives the rotation of this pump unit. In this case, the servomotor 3s utilizes an AC servomotor which can be controlled to rotate forward or in reverse by being connected to a servo circuit (servo amplifier) 3sa, and a rotary encoder 3se is installed which detects the rotation speed of this servomotor 3s.

Also, the pump unit 25 contains a pump machine body 26 constituted of a swash plate piston pump. Therefore, the pump unit 25 is equipped with a swash plate 27 (FIG. 3), wherein creasing the swash plate angle Rs which becomes the inclination angle of the swash plate 27 increases the stroke of the pump piston in the pump machine body 26 and the discharge flow rate, and decreasing the swash plate angle Rs decreases the stroke of the same pump piston and the discharge flow rate. By setting the swash plate angle to a specified angle, fixed discharge flow rates Qo . . . can be set which fix the discharge flow rate to a specified amount. Furthermore, the swash plate 27 has a control cylinder 28 and a return spring 29 installed, where the control cylinder 28 is connected to the discharge port of the pump unit 25 (pump machine body 26) via a switching valve (electromagnetic valve) 30. By this the angle of the swash plate 27 can be changed by controlling the control cylinder 28. Note that indicated as 31 is a pressure sensor which detects the discharge pressure of the pump unit 25.

Therefore, if the rotation of the servomotor 3s is variably controlled, the discharge flow rate and the discharge pressure of the variable discharge hydraulic pump 2v can be varied, on the basis of which driving of said cylinders 4a, 4c, 4d, and 4e, and measuring motor 4b can be controlled, and operational processes in the molding cycle can be controlled. Because the servomotor 3s is used as the driving motor 3, the control method of this embodiment can be implemented easily and securely, with the advantage that the effect of said control method can be enjoyed more effectively.

On the other hand, the intake port of the pump unit 25 connects to an oil tank 32, the discharge port of the pump unit 25 connects to the primary side of the switching valve circuit 22, and furthermore the secondary side of the switching valve circuit 22 connects to the injection cylinder 4a, the measuring motor 4b, the mold clamping cylinder 4c, the ejection cylinder 4d, and the injector moving cylinder 4e which constitute the hydraulic actuator in the injection molding machine M as shown in FIG. 3. Therefore, the switching valve circuit 22 is equipped with switching valves (electromagnetic valves) 22a, 22b, 22c, 22d, and 22e which connect at least to the injection cylinder 4a, the measuring motor 4b, the mold clamping cylinder 4c, the ejection cylinder 4d, and the injector moving cylinder 4e, respectively. The switching valves 22a, . . . are constituted with one or more valve parts and necessary accessory hydraulic parts, and have switching functions relating to the supply, stoppage, and exhausting of operating oil at least for the injection cylinder 4a, the measuring motor 4b, the mold clamping cylinder 4c, the ejection cylinder 4d, and the injector moving cylinder 4e.

Also, indicated as 5 is a control means equipped with a molding machine controller 41. Connected to the molding machine controller 41 is the servomotor 3s via the servo circuit 3sa, and the rotary encoder 3se installed with the servomotor 3s connects the servo circuit 3sa. Furthermore, connected to the molding machine controller 41 are switching valves 22a, 22b, 22c, 22d, 22e, and the switching valve 30 utilizing electromagnetic valves, and further the pressure sensor 31.

Figure 4:
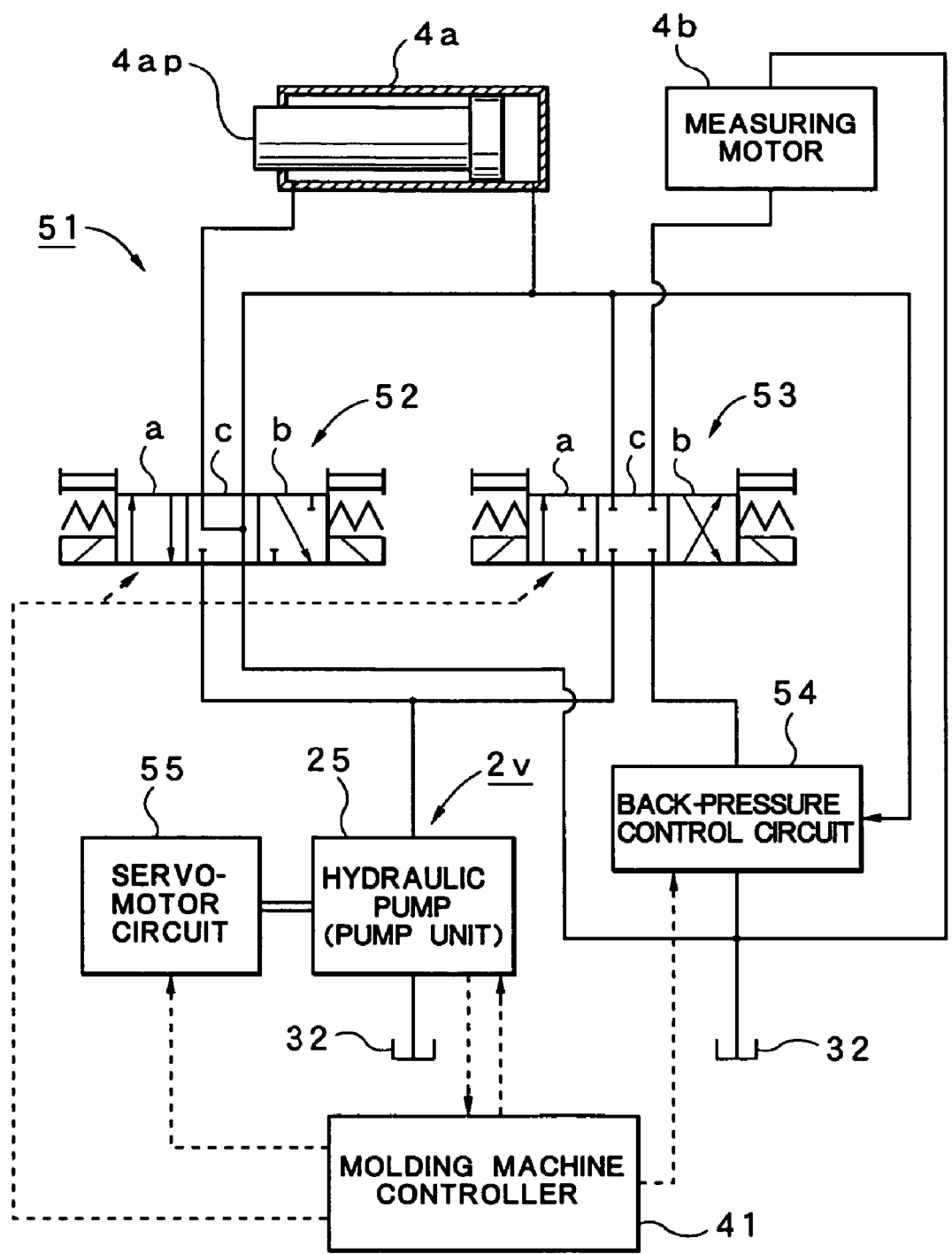
FIG. 4: A hydraulic circuit diagram extracting a hydraulic circuit of the injector side in the same injection molding machine.

Furthermore, shown in FIG. 4 is an extracted view of a hydraulic circuit 51 on the injector Mi side. In the same figure, indicated as 52 and 53 are switching valves as valve parts, 54 is the back-pressure control circuit, and 55 is the servomotor circuit, where the parts and circuits are connected or pipelined as in the figure. In this case, the servomotor circuit 55 contains said servomotor 3s, rotary encoder 3se, and servo circuit 3sa. Also, in another configuration in FIG. 4 the same codes are attached to the same parts as in FIG. 2 and FIG. 3 to clarify the configuration. Note that indicated as 4ap is a single rod piston contained in the injection cylinder 4a. The operations (functions) of this hydraulic circuit 51 are described later.

Next, a control method using such injection molding machine M is explained with reference to FIG. 1~FIG. 5.

Shown in FIG. 5 is a list showing the concrete operation names and the presence/absence of the unload command performed in the measurement process and the injection process which are a part of operational processes in the molding cycle of the injection molding machine M. In this case, in the measurement process, an "injection pressure release" process, a "pre-measurement decompression" process, a "measurement start timing adjustment" process, a "measurement at speed 1" process, a "measurement at speed 2" process, a "measurement at speed 3" process, a "measurement stop timing adjustment" process, a "decompression start timing adjustment" process, and a "decomposition" process are sequentially performed, and especially in the "injection pressure release" process to release pressure after finishing the injection process, the "measurement start timing adjustment" process to perform timing adjustment in starting a measurement, the "measurement stop timing adjustment" process to perform timing adjustment in stoping a measurement, and the "decompression start timing adjustment" process to perform timing adjustment in starting the decompression process, a process to lower the pressure to the unload pressure (specified pressure) Pn, and the switching controls of the corresponding switching valves are performed.

Note that the unload pressure Pn is not zero pressure but a pressure with no load which becomes about 6% of the maximum pressure (rated pressure). In this way, using the unload pressure as the specified pressure Pn has the advantage that substantial pressure release can be securely performed on the residual pressure of the whole circuit from the hydraulic actuator such as the injection cylinder 4a and the hydraulic pump 2.

Similarly, in the injection process, an "injection start timing adjustment" process, an "injection switching valve ON" process, an "injection at speed 1" process, an "injection at speed 2" process, an "injection at speed 3" process, an "injection at speed 4" process, an "injection at speed 5" process, an "injection at speed 6" process, a "pressure holding at pressure 1" process, a "pressure holding at pressure 2" process, and a "pressure holding at pressure 3" process, are sequentially performed, and especially in the "injection start timing adjustment" process to perform timing adjustment in starting injection after the measurement process is finished and the "injection switching valve ON" process to switch the injection switching valve 53 (FIG. 4) to the ON (open) side in starting injection, a process of lowering the pressure to the unload pressure (specified pressure) Pn is performed in either case, after which switching of the corresponding switching valves is performed.

Figure 1:
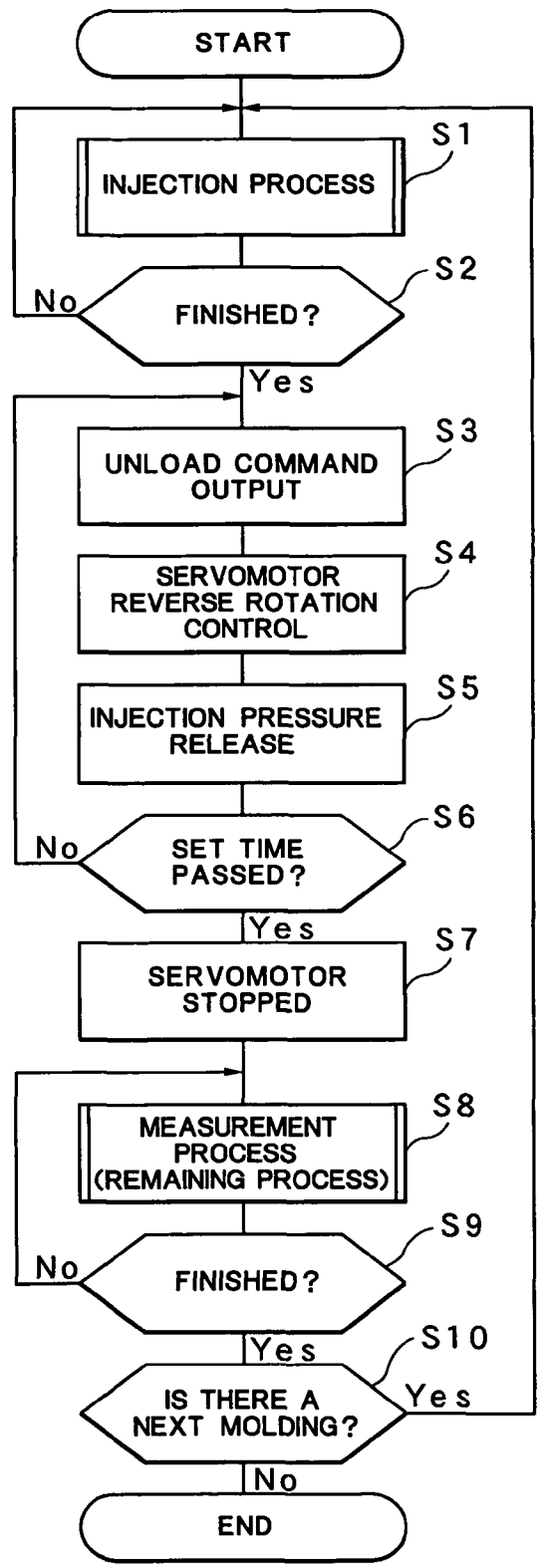
FIG. 1: A flow chart for explaining in sequence the control method of an injection molding machine of the best embodiment of this invention.

Next, specific processing steps of the control method of this embodiment are explained with reference to FIG. 1 and FIG. 4 taking as an example the "injection pressure release" process which releases pressure immediately after finishing the injection process. Shown in FIG. 1 is a flow chart showing the processing steps in performing the "injection pressure release" process.

Now a case where the injection process is finished is assumed (Steps S1 and S2). In the injection process, the switching valve 52 is switched to a symbol b and the switching valve 53 to a symbol a in FIG. 4, and when the injection process is finished, the "pressure holding at pressure 3" process of the injection process shown in FIG. 5 is finished.

By the injection process (the "pressure holding at pressure 3" process) being finished, the unload command for lowering the pressure to the unload pressure Pn is output from the molding machine controller 41. Also, the reverse rotation command is given to the servomotor 3s (the servomotor circuit 55) based on the output of the unload command, and the reverse rotation control is performed to the servomotor 3s (Step S4). By this, the injection pressure release process which forcibly lowers the pressure Pd (residual pressure) when the injection process is finished (Step S5). The injection pressure release process is performed only over a preset length of time, and once the present length of time has passed, control is exercised to stop the reverse rotation control, namely to stop the servomotor 3s (Steps S6 and S7).

Because the pressure Pd when the injection process is finished is the amount based on the "pressure holding at pressure 3" process and can be predicted in advance, also predictable is the time it takes for the pressure Pd to decrease to the unload pressure Pn when the servomotor 3s is controlled to rotate in reverse. Therefore, the time needed to lower the pressure securely to the unload pressure Pn is set as the preset length of time.

Because the pressure Pd is detected by the pressure sensor 31, the pressure Pd detected by the pressure sensor 31 may be monitored, and the reverse rotation control to the servomotor 3s may be stopped when the detected pressure Pd has reached the unload pressure Pn. Therefore, setting the preset length of time becomes unnecessary in this case.

Also, the pressure Pd when the injection process is finished may be detected by the pressure sensor 31, and the reverse rotation control to the servomotor 3s may be performed when the pressure difference ΔP between this pressure Pd and the unload pressure Pn is equal to or larger than the present amount. By this, the reverse rotation control to the servomotor 3s can be performed only when the pressure Pd needs to be lowered rapidly, having an advantage of preventing unnecessary reverse rotation control to the servomotor 3s.

On the other hand, once the hydraulic circuit 51 containing the hydraulic pump 2v has achieved the unload pressure Pn, under this condition, valve switching is performed for the measurement process, such as switching the switching valve 53 to the symbol b. In this case, because the hydraulic circuit 51 containing the hydraulic pump 2v has the unload pressure Pn, any inconvenience such as occurrence of shock pressure is prevented in switching the valves (switching operations) for a smooth switch, and a highly-accurate and stable operation control can be performed in the following measurement process (Step S8). Also, once the measurement process is finished, it proceeds to the injection process (Steps S9 and S10).

Although explained in the above is the control method of this embodiment taking the "injection pressure release" process in the measurement process as an example, the same control, namely the unload command can be output to perform the reverse rotation control to the servomotor 3s in the "measurement start timing adjustment" process, the "measurement stop timing adjustment" process, the "decompression start timing adjustment" process, the "injection start timing adjustment" process, and the "injection switching valve ON" process in FIG. 5. Also, although only the measurement process and the injection process were dealt with in FIG. 5, the same control can be performed in other operational processes in the molding cycle such as the mold open/close process, the clamping process, and the ejection process. Furthermore, the reverse rotation control to the servomotor 3s can be performed at an operation change in an operational process. By this, in addition to a switch between operational processes, for an operation change in an arbitrary operational process, such as a switch from a high-speed operation to a low-speed operation, a quick switch can be performed, realizing the operational control of higher precision and stability.

Therefore, by the control method of the injection molding machine M of this embodiment, because the residual pressure of the whole circuit from the hydraulic actuator such as the injection cylinder 4a to the hydraulic pump 2v can be securely lowered to a specified target pressure, namely the unload pressure Pn, inconveniences such as the occurrence of shock pressure at operation changes can be prevented, smooth switching can be performed, and highly precise and stable operation control can be performed. Also, because the unload pressure Pd is forcibly lowered by controlling the servomotor 3s to rotate in reverse, even if there occurs fluidity of the operation oil or flow path resistance of the circuit, the pressure can be lowered quickly to the unload pressure Pn, and a quick operational change can be performed.

In this embodiment, because used as the hydraulic pump 2 is a variable discharge hydraulic pump 2v which can set fixed discharge flow rates Qo . . . by changing the swash plate angle Rs, fixed discharge flow rates Qo . . . corresponding to the operational processes in the molding cycle can be set in advance based on specified conditions. Especially, by installing multiple operation modes by combining multiple operational processes and multiple fixed discharge flow rates Qo . . . and selecting an operation mode at the time of molding, the discharge flow rate of the hydraulic pump 2v can be switched to a fixed discharge flow rate Qo . . . which corresponds to each operational process.

The method of installing this operation mode is explained below. First, two fixed discharge flow rates Qo and Qs are set, where one fixed discharge flow rate Qo is set to the standard discharge flow rate. Therefore, the swash plate angle Rs is set to a relatively small angle (low-capacity side). As opposed to this, the other fixed discharge flow rate Qs can be set larger than the fixed discharge flow rate Qo, more concretely, about twice as the fixed discharge flow rate Qo. Therefore, the swash plate angle Rs is set to a relatively large angle (high-capacity side). Namely, the other fixed discharge flow rate Qs can be set to a discharge flow rate which does not give much adverse influence to the servomotors 3p and 3q over a relatively short length of time (about a few seconds) but can give an adverse influence to the servomotors 3p and 3q if it continues for a relatively long time.

Also, the filling process and the pressure holding process can be applied as the operational process. Note that operational processes other than these do not become candidates of selection as the operation mode but are set to the standard fixed discharge flow rate Qo. In the filling process, the fixed discharge flow rates Qo and Qs are set according to the injection speed (specified condition) in the filling process. Specifically, if the filling process speed (injection speed) is slow (Condition T1), for example if it is 50% of the rated speed or lower, the fixed discharge flow rate Qo which makes the swash plate angle Rs small is set, and if the filling process speed is fast (Condition T2), for example if it is 100% of the rated speed, the fixed discharge flow rate Qs which makes the swash plate angle Rs large is set. On the other hand, in the pressure holding process, the fixed discharge flow rates Qo and Qs can be set according to the length of time (specified condition) for the pressure holding process. Specifically, if the length of time for the pressure holding process is normal or long (Condition T3), the fixed discharge flow rate Qo is set, and if the length of time for the pressure holding process is short, being a few seconds (Condition T4), or if the pressure change when switching from the filling process to the pressure holding process is large, the fixed discharge flow rate Qs is set.

Because the above settings becomes possible, as the operation mode, a first operation mode where the fixed discharge flow rate Qo is set in both the filling process and the pressure holding process, a second operation mode where the fixed discharge flow rate Qs is set in the filling process and the fixed discharge flow rate Qo is set in the pressure holding process, and a third operation mode where the fixed discharge flow rate Qs is set in both the filling process and the pressure holding process can be installed.

Therefore, if the filling process speed (set speed) is low in the molding condition, the first operation mode can be selected. Also, if the filling process speed is high, the second operation mode can be selected. In advancing the screw 12 at a high speed, because a large flow rate becomes necessary, the second operation mode becomes preferred. Furthermore, if the filling process speed is high and the pressure change in switching from the filling process to the pressure holding process is large, of if the length of time for the pressure holding process is small, the third operation mode can be selected. Although there believed to be small number of cases where the third operation mode is used, it is effective when high-speed filling is necessary and the pressure for the pressure holding process is lowered rapidly, for example when the molded product thickness is extremely small.

On the other hand, at the time of molding, each operation mode may be selected. Namely, by selecting an arbitrary operation mode, the fixed discharge flow rate Qo or QS is based on the selected operation mode is set by the variable discharge hydraulic pump 2v in the filling process and the pressure holding process, and the standard fixed discharge flow rate Qo is set in other processes. Also, controls in the individual processes including the filling process and the pressure holding process are performed by variably controlling the rotation speed of the servomotor 3s.

In this way, if the variable discharge hydraulic pump 2v which can set multiple fixed discharge flow rates Qo and Qs by changing the swash plate angle Rs is used in the hydraulic pump 2, in controlling the operational processes by variably controlling the rotation speed of the servomotor 3s, because the hydraulic pump 2v can be used as practically multiple hydraulic pumps of large-capacity type and small-capacity type, a separate measure for an unstable range where the rotation speed of the servomotor 3s becomes small becomes unnecessary or can be reduced, contributing to improving the energy savings and reduction of the running cost. Also, because the range which is not suitable for the operation capability of the servomotor 3s can be reduced in each operational process in the injection molding machine M, control stabilization can be achieved, which contributes to the improvement in moldability and quality of the molded products and also contributes to improvement in reliability and extending the lifetime by preventing or reducing the occurrences of overloading. Furthermore, because it becomes possible to select the servomotor 3s which has a lower performance than the maximum capability of the injection molding machine M, there is an advantage of reducing the initial cost of the whole including the servo circuit by realizing miniaturization of the servomotor 3s.

While the best embodiment is explained in detail above, this invention is not limited to this embodiment but can be arbitrarily modified in the detailed configuration, method, quantity, etc. and added to or removed from upon necessity within a range which does not deviate from the spirit of this invention.

For example, although the variable discharge hydraulic pump 2v which can set multiple fixed discharge flow rates Qo . . . by changing the swash plate angle Rs was shown as an example of the hydraulic pump 2, another hydraulic pump 2 having the same functions may be used. Also, although the servomotor 3s capable of the forward rotation control or the reverse rotation control by connecting to the servo circuit 3sa was shown as an example of the driving motor 3, another driving motor 3 having the same functions may be used. Furthermore, although shown was a case where the unload pressure was applied to the specified pressure Pn, it is not limited to this unload pressure.

What is claimed is:

1. A method of controlling an injection molding comprising the steps of:
controlling an operational process selected from a group consisting of a measurement process, an injection process, a mold open/close process, a clamping process, and an ejection process in a molding cycle by controlling a rotation speed of a servomotor in a hydraulic pump; and driving a hydraulic actuator; and
lowering a pressure in said at least one operational process to a predetermined pressure by controlling said servomotor in reverse rotation by giving a reverse rotation command to the servomotor based on an output of an unload command when the unload command is output from a molding machine controller, said predetermined pressure being an unload pressure, wherein a step of controlling the reverse rotation of said servomotor is performed for a predetermined period of time during a switch from one operational process to another operational process.

2. The method of controlling an injection molding machine of claim 1 wherein said hydraulic pump is a variable discharge hydraulic pump which is adapted to set multiple fixed discharge flow rates by changing a swash plate angle.

3. The method of controlling an injection molding machine of claim 1 wherein said driving motor is a servomotor which is adapted to control forward rotation or the reverse rotation by connecting to a servo circuit.

4. The method of controlling an injection molding machine of claim 1, wherein the step of controlling the reverse rotation of said driving motor is performed when a difference between the pressure in the at least one operational process and said predetermined pressure is equal to or larger than a preset pressure amount.

5. The method of controlling an injection molding machine of claim 1 wherein the step of controlling the reverse rotation of said driving motor is performed at an operation change in the at least one operational process.

6. The method of controlling an injection molding machine of claim 5 wherein the step of controlling the reverse rotation of said driving motor is performed when a pressure difference between the pressure in the at least one operational process and said predetermined pressure is equal to or larger than a preset pressure amount.

* * * * *